United States Patent
Lavery et al.

(10) Patent No.: US 6,319,309 B1
(45) Date of Patent: Nov. 20, 2001

(54) INK ADDITIVES

(75) Inventors: Aidan Joseph Lavery, High Wycombe; Janette Watkinson, Manchester; Mark Robert James, Rawtenstall, all of (GB)

(73) Assignee: Avecia Limited (GB)

( * ) Notice: Subject to any disclaimer, the term of this patent is extended or adjusted under 35 U.S.C. 154(b) by 0 days.

(21) Appl. No.: 09/402,270

(22) PCT Filed: Mar. 9, 1998

(86) PCT No.: PCT/GB98/00699

§ 371 Date: Dec. 23, 1999

§ 102(e) Date: Dec. 23, 1999

(87) PCT Pub. No.: WO98/44057

PCT Pub. Date: Oct. 8, 1998

(30) Foreign Application Priority Data

Apr. 1, 1997 (GB) .................................................. 9706580

(51) Int. Cl.⁷ .............................. C09D 11/02; B05D 1/26; B32B 3/00; B32B 27/14
(52) U.S. Cl. .................................... 106/31.27; 106/31.35; 106/31.43; 106/31.58; 427/466; 428/195
(58) Field of Search ............................. 106/31.27, 31.35, 106/31.43, 31.58; 427/466; 428/195

(56) References Cited

U.S. PATENT DOCUMENTS

| | | | |
|---|---|---|---|
| 4,101,329 | * | 7/1978 | Loock ................................ 106/31.43 |
| 5,258,064 | * | 11/1993 | Colt .................................... 106/31.27 |
| 5,478,383 | * | 12/1995 | Nagashima et al. .............. 106/31.43 |

FOREIGN PATENT DOCUMENTS

| | | | |
|---|---|---|---|
| 0356080-A | * | 2/1990 | (EP) . |
| 0648821-A | * | 4/1995 | (EP) . |
| WO-95/27759-A | * | 10/1995 | (WO) . |

* cited by examiner

Primary Examiner—Helene Klemanski
(74) Attorney, Agent, or Firm—Rothwell, Figg, Ernst & Manbeck

(57) ABSTRACT

The use of a polybasic acid and a volatile base, or a salt formed by the said acid and base, in an aqueous ink to increase the water-fastness of a water-soluble dye contained in the ink.

Also claimed are novel aqueous inks containing an organic polybasic acid and a volatile base, a method of ink jet printing using the inks, a substrate printed with the inks and an ink jet printer cartridge containing the inks.

31 Claims, No Drawings

INK ADDITIVES

The present invention relates to the use of additives in an ink, to aqueous ink compositions, and to substrates printed with the inks.

It is desirable for ink jet printing inks to give images having high water fastness and good optical density. Clogging of the ink jet nozzle during the printing process is often reduced or prevented by using ink colorants having a high solubility in the ink medium. However, when the inks are aqueous, highly soluble dyes can result in printed images having poor water fastness because the dye remains water-soluble on the printed substrate.

WO 95/27759 discloses aqueous inks containing a colorant and a binder material capable of ionically or physically entrapping the colorant.

EP 648 821 discloses inks containing a colorant and certain aromatic monobasic acids and non volatile polyamine derivatives.

EP 356 080 discloses aqueous inks containing dyes and an ammonium salt of a monobasic acid.

We have found that the use of a polybasic acid and a volatile base in inks give a surprising increase in water fastness. In addition, the optical density of resultant prints is retained and, in some cases, there is less bronzing.

The term "water fastness" refers to the resistance of a printed dye to running or smudging on contact with water on a printed substrate.

The term "bronzing" refers to an undesirable metallic bronze appearance that can detract from the true black colour desired for many inks.

According to a first aspect of the present invention there is provided the use of a polybasic acid and a volatile base, or a salt formed by the said acid and base, in an aqueous ink to increase the water fastness of a water-soluble dye contained in the ink.

The polybasic acid can be any compound having two or more acidic protons. By way of illustration $H_2SO_4$, 1,4-dicarboxybenzene and phenylphosphonic acid are all dibasic acids and $H_3PO_4$ and 1,3,5-tricarboxy benzene are tribasic acids. Preferably the polybasic acid free from chromophoric groups, more preferably it is colourless or substantially colourless because coloured polybasic acids can alter the colour of the ink.

The polybasic acid may be an organic or an inorganic acid, preferably with a first pKa in the range of from 2.0 to 6.0, more preferably from 2.8 to 5 and a second pKa in the range of from 3.5 to 8, more preferably from 4 to 6.

When the polybasic acid is inorganic, it is preferably phosphoric acid, pyrophosphoric acid, a polyphosphoric acid or molybdic acid. Preferably the polybasic acid is an organic polybasic acid because we have found that these give a higher waterfastness than inorganic acids. In addition, the buffering effect of a weak organic polybasic acid with the base reduces corrosion of the ink jet print head which can occur if strong acids are used. Preferred organic polybasic acids have groups selected from carboxy, sulpho, phosphato, phosphono, a monobasic phosphate ester, a monobasic phosphonic ester, —COSH and thiol, more preferably carboxy and sulpho, especially carboxy.

The organic polybasic acid is preferably an aromatic or aliphatic polybasic acid, more preferably of Formula (1):

$$Z-X_n \qquad (1)$$

wherein:

Z is an aliphatic or aromatic group;

each X independently is an acidic group;

n is 1, 2, 3 or 4;

provided that the acid is polybasic.

X may be any of the hereinbefore mentioned acidic groups present on the organic polybasic acid.

Preferably X is —COOH, —SO$_3$H, phosphato (—OP(O)(OH)$_2$), a phosphono (—P(O)(OH)$_2$), a phosphate ester group of the formula —OP(O)(OR)(OH) or a phosphonic ester group of the formula —P(O)(OR)(OH), wherein R is optionally substituted $C_{1-6}$-alkyl or optionally substituted phenyl. Preferred substituents on R include, for example, —OH, —NH$_2$, —NO$_2$, halogen, (especially F and Cl) and $C_{1-4}$-alkyl, especially methyl and ethyl.

Aromatic Polybasic Acids

Preferred aromatic polybasic acids are of the Formula (1) wherein Z is an aromatic group Ar. Ar is preferably an optionally substituted monocyclic or polycyclic aromatic group containing up to 10 carbon atoms and optionally containing one or more heteroatoms.

Preferred monocyclic aromatic groups represented by Ar are optionally substituted phenyl, pyridyl, pyridonyl, thiophenyl and furanyl groups.

When Ar is a polycyclic aromatic group it is preferably a polycyclic aromatic group wherein the cyclic rings are fused together or linked by a single covalent bond or a linker group. Suitable linker groups include ether, thioether, amino, carbonyl, alkyl and alkenyl groups.

Preferred polycyclic aromatic groups wherein the cyclic rings are fused together include optionally substituted naphthyl, quinolinyl, indolinyl, benzothienyl and benzofuranyl.

Preferred polycyclic aromatic groups wherein the cyclic rings are linked by a single covalent bond or a linker group include biphenyl, stilbenyl and diphenylmethane.

The optional substituents which may be present on Ar are preferably selected from halogen (especially F or Cl); —NO$_2$; —CF$_3$; —CN; a $C_{1-6}$-alkyl, $C_{2-6}$-alkenyl, $C_{5-8}$-cycloalkyl or $C_{1-6}$-alkoxy group optionally substituted by —OH, —NH$_2$, —NO$_2$ or halogen; a group of the formula —SR$^1$, or —COOR$^1$ wherein R$^1$ is H, $C_{1-4}$-alkyl, $C_{5-8}$-cycloalkyl or phenyl; and groups of the formula —OR$^2$, —COR$^2$; —NR$^2$R$^3$, —SO$_2$NR$^2$R$^3$, —SOR$^2$, —SO$_2$R$^2$, —NR$^2$COR$^3$, —CONR$^2$R$^3$, or —OCOR$^2$, wherein R$^2$ and R$^3$ each independently represent H, $C_{1-4}$-alkyl, $C_{5-8}$-cycloalkyl, phenyl or R$^2$ and R$^3$ together with the nitrogen to which they are attached form a 5 or 6 membered ring, for example piperazine or morpholine.

Preferably Ar is optionally substituted phenyl.

Preferred acidic groups present in the aromatic polybasic acid are —SO$_3$H and —COOH, more preferably —COOH.

As hereinbefore defined, the acid must be a polybasic acid. Accordingly, when n is 1 in Formula (1) X will be a polybasic acidic group, for example phosphato or phosphono.

Preferably n is 2, 3 or 4, more preferably 2 or 3, especially 2.

Preferred aromatic polybasic acids for use in the present invention include aromatic tetrabasic acids, for example pyromellitic acid, aromatic tribasic acids, for example trimesic acid, trimellitic acid, 4-sulphophthalic acid, 3,5-disulphobenzoic acid and aromatic dibasic acids, for example phthalic, isophthalic and terephthalic acid, thiosalicylic acid and p-mercaptobenzoic acid. Especially preferred aromatic polybasic acids are optionally substituted dibenzoic acids, for example phthalic acid, isophthalic acid and terephthalic acid, more especially terephthalic acid.

Aliphatic Polybasic Acids

Preferred aliphatic polybasic acids contain up to 20 carbon atoms. Preferably the aliphatic polybasic acids contain 2 to 8, more preferably 2 to 6, especially 2 or 3 and more especially 2 acid groups. The aliphatic polybasic acid may be saturated or unsaturated.

Preferred acid groups in the aliphatic polybasic acids are as hereinbefore defined for the aromatic polybasic acids. More preferably the acid groups are carboxy or sulpho, especially carboxy.

Preferred saturated groups are alkanes and preferred unsaturated groups are alkenes and alkynes. The alkane, alkene and alkyne groups may be straight chain, branched chain or cyclic and are optionally interrupted by one or more groups or heteroatoms, for example —O—, —S—, —NR$^4$—, optionally substituted phenyl, piperazine and —C(O)—, wherein R$^4$ is H, optionally substituted alkyl, or optionally substituted aryl. The alkane and alkene groups optionally contain further substituents, preferably selected from —SH, or —OR$^2$, wherein R$^2$ is as hereinbefore defined, more preferably —OH.

When the alkane, alkene or alkyne group is interrupted by an optionally substituted phenyl group, it is preferred that the optional substituents on the phenyl are selected from —OH, —NO$_2$, —NH$_2$, $C_{1-4}$-alkyl, —SH, —COOH and —SO$_3$H.

Preferably R$^4$ is H, optionally substituted $C_{1-4}$-alkyl or optionally substituted phenyl, more preferably H, $C_{1-4}$-alkyl, $C_{1-4}$-alkyl substituted by —OH, phenyl or phenyl substituted by —OH, —NH$_2$, —NO$_2$, $C_{1-4}$-alkyl or $C_{1-4}$-alkyl substituted by —OH.

Especially preferred aliphatic polybasic acids are dicarboxylic acids of the Formula (2):

$$\text{HOOC—W—COOH} \qquad (2)$$

wherein:
W is an optionally substituted, optionally interrupted alkylene, alkenylene or alkynylene group.

W may be straight chain, branched chain or cyclic.

Examples of optionally substituted alkenylene and alkynylene groups include —CH=CH—, —CH$_2$CH=CH—, —CH$_2$CH=CHCH$_2$—, —C≡C— and —CH$_2$C≡CCH$_2$—.

When W is a substituted alkenylene group, it is preferably substituted by —OH.

Preferred groups which may interrupt W are —O—, —S—, —NH—, —C(O)— and phenylene optionally substituted by —OH, —NH$_2$, —SH, —COOH or —SO$_3$H.

Preferred interrupted alkylene groups are of the formula:

wherein:
L is —O—, —S—, —NH—, —C(O)— or phenylene optionally substituted by —OH, —NH$_2$, —SH, —COOH or —SO$_3$H;
a is an integer from 1 to 18; and
b is an integer from 0 to 17, provided that (a+b)≦18.

For example, —CH$_2$—O—CH$_2$—, —CH$_2$—C$_6$H$_4$—CH$_2$—, —C$_6$H$_4$CH$_2$—, —CH$_2$C(O)CH$_2$—, —CH$_2$SCH$_2$— and —C$_6$H$_4$C$_2$H$_4$—.

Preferred optionally substituted cyclic alkylene and alkenylene groups represented by W include for example cyclohexenylene, cyclohexylene, morpholinylene, piperazinylene and piperidinylene groups.

Preferably W is an optionally substituted straight or branched chain alkylene group. When W is a substituted alkylene group it is preferably substituted by one or more —OH groups. Examples of such groups include —CH(OH)—, —CH(OH)CH(OH)— and —CH$_2$CH(OH)—.

It is especially preferred that W is a group of the formula —C$_m$H$_{2m}$—, wherein m is 1 to 18, preferably 1 to 10 and especially 1 to 8.

Preferred dicarboxy acids of the Formula (2) when W is an alkenylene group include for example maleic acid, fumaric acid, citraconic acid and itaconic acid.

Preferred dicarboxy acids of the Formula (2) when W is a straight chained alkylene group substituted by —OH include for example malic acid, tartronic acid, tartaric acid and mucic acid.

Preferred dicarboxy acids of the Formula (2) when W is group of the formula —C$_m$H$_{2m}$—, wherein m is as hereinbefore defined include for example malonic acid, succinic acid, glutaric acid, adipic acid, pimelic acid, suberic acid, azelaic acid and sebacic acid and dodecanedioc acid.

Preferred dicarboxy acids of the Formula (2) when W is a cyclic alkylene or alkenylene group include for example, cyclohexene dicarboxylic acid and cyclohexane dicarboxylic acid.

Further examples of aliphatic polybasic acids suitable for use in the present invention include, but are not limited to tetrabasic acids, for example 1,2,3,4-butanetetracarboxylic acid, tribasic acids, for example citric acid, nitrilotriacetic acid and nitrilotris(methylene)triphosphoric acid and dibasic acids, for example oxalic acid, diglycolic acid, 3,3'-thiodipropionic acid, thiodiglycolic acid, camphoric acid, 1,1-cyclohexane diacetic acid, 1,3-acetondicarboxylic acid, sulphoacetic acid and phosphonoacetic acid.

Especially preferred organic polybasic acids are aliphatic polybasic acid because we have found that when these acids are added to an ink, the ink exhibits good operability when incorporated into an ink jet printer and provides prints which exhibit a high water-fastness.

In view of the foregoing preferences, especially preferred polybasic acids are phosphoric acid, phthalic acid, 4-sulphophthalic acid, terephthalic acid, phthalic acid, isophthalic acid, acids of the formula HOOC(CH$_2$)$_p$ COOH, wherein p is 1 to 9, fumaric acid, tartaric acid, malic acid, maleic acid and nitrilotriacetic acid and more especially malonic acid, succinic acid, glutaric acid, adipic acid, pimelic acid, suberic acid, azelaic acid, sebacic acid and dodecanedioc acid.

The polybasic acid is preferably present in the ink at an amount of from 0.1 to 10, more preferably 0.25 to 5 and especially 0.5 to 2 parts to weight based upon the weight of the ink.

The volatile base preferably has a boiling point of less than 80° C., more preferably less than 50° C.

It is preferred that the volatile base is an amine. Preferred amines are of the formula NQ$_3$ in which each Q independently is H, C$_{1-4}$-alkyl, C$_{1-4}$-alkyl substituted by —OH, or two or three Qs together with the nitrogen atom to which they are attached form a heterocyclic ring and all remaining Qs are selected from H and C$_{1-4}$-alkyl. Preferred heterocyclic rings formed by NQ$_3$ are 5 or 6 membered heterocyclic rings.

As examples of amines of formula NQ$_3$ there may be mentioned ammonia, methylamine, dimethylamine, trimethylamine, ethylamine, diethylamine, propylamine, isopropylamine, di-isopropylamine, isobutylamine, tert-butylamine and cyclopentylamine.

It is especially preferred that the volatile base is ammonia.

Preferably the volatile base is added to the ink as a solution more, preferably an aqueous solution.

Preferably the volatile base is present in the ink in an amount sufficient to neutralise at least one, more preferably at least two of the acid groups present on the polybasic acid.

It is especially preferred that sufficient volatile base is added to the ink such that the pH of the ink has a value in the range of from 4 to 12, preferably 5 to 12, especially from 7 to 11 and more especially from 7.5 to 11.

When the polybasic acid and volatile base are added as a salt, the salt is one formed between any of the hereinbefore mentioned polybasic acids and volatile bases or a mixed salt of the acid, the volatile base and one or more other counter ions. Examples of suitable salts formed between the acid and volatile base include for example, di basic ammonium phosphate $((NH_4)_2HPO_4)$, ammonium terephthalate, ammonium adipate, ammonium azelate, ammonium succinate, diammonium succinate and methylammonium citrate.

When the salt is a mixed salt of the polybasic acid it is preferably water-soluble, more preferably it is a mixed salt of the polybasic acid with the volatile base and one or more alkali metals, especially Li, Na and K. Especially preferred mixed salts are salt with ammonia and one or more metals selected from Li, Na and K, for example ammonium lithium succinate and ammonium sodium terephthalate.

It is especially preferred that the salt is an ammonium salt of the polybasic acid.

When a salt is used in the present invention, the salt is preferably used in an amount of from 0.1 to 5, more preferably from 1 to 3 parts by weight based upon the weight of the ink.

It is to be understood that the present invention relates not only to the use of a single polybasic acid and a volatile base but also to the use of mixtures of polybasic acids and volatile bases. Similarly, a mixture of salts formed between a polybasic acid and volatile base can be used in an ink to increase the water fastness of a water-soluble dye contained in the ink.

As will be clear from the foregoing the present invention relates to the use of a polybasic acid together with a volatile base in an ink to increase the water-fastness of the water-soluble dye contained in the ink.

There are no particular constraints on the dye contained in the ink, provided that it is water-soluble. Suitable dyes include, for example, water-soluble azo, phthalocyanine, triphenodioxazine, formazan and anthraquinone dyes, especially water-soluble azo and phthalocyanine dyes. Preferred azo dyes are monoazo, disazo and trisazo dyes. Numerous suitable dyes are listed in the Colour Index International. Suitable dyes include for example, C.I. Direct Black 168, Direct Black 19, Direct Yellow 86, Direct Yellow 132, Direct Yellow 142, Acid Red 249, Acid Red 52, Acid Violet 106, Direct Blue 199 and Acid Blue 9.

It is preferred that the dye used in the ink has a solubility in water which is dependent upon pH. It is particularly preferred that the water solubility of the dye reduces as pH is reduced.

In a preferred embodiment of the present invention, the water-soluble dye used in the ink is a dye having at least as many carboxy groups as sulpho groups. It has been found that inks containing such dyes exhibit a particularly good waterfastness when a polybasic acid and volatile base are added to the ink. Examples of preferred dyes in this embodiment dyes includes Dye (1) to (15):

Dye (1) and salts and mixtures thereof, especially the ammonium salt:

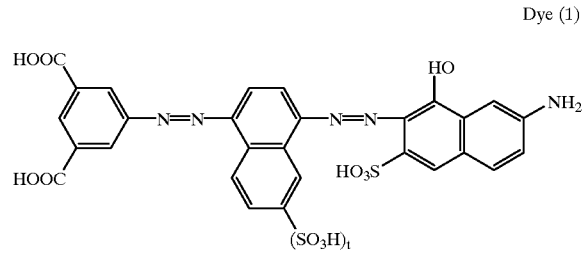

Dye (1)

wherein t is 0 or 1;

Dye (2) and salts thereof, especially the ammonium salt:

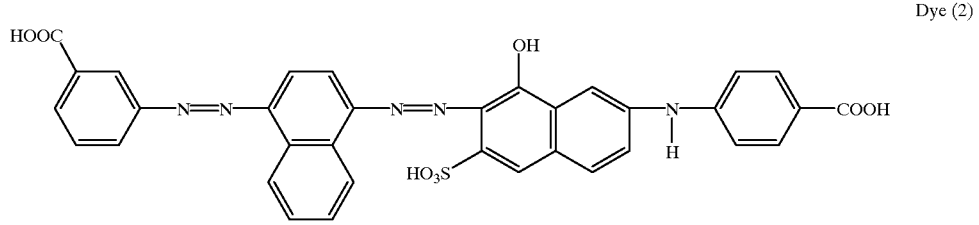

Dye (2)

Dye (3) and salts thereof, especially the ammonium salt;

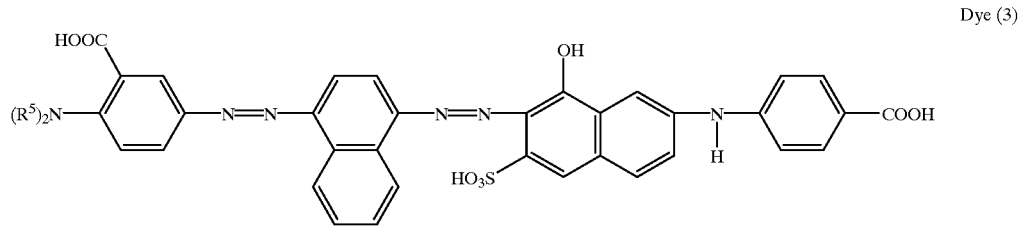

Dye (3)

wherein each $R^5$ independently is ethyl, propyl or butyl.

Dye (4) and salts thereof; especially the ammonium salt;
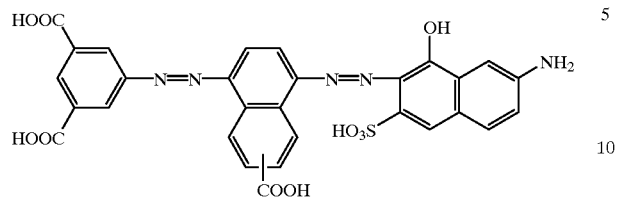
Dye (4)
Dye (5) and salts thereof:
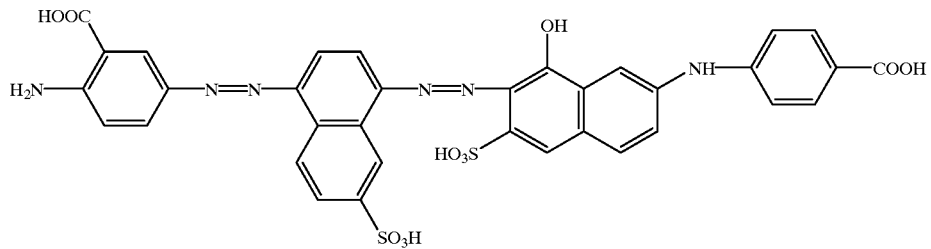
Dye (5)
Dye (6) and salts thereof:
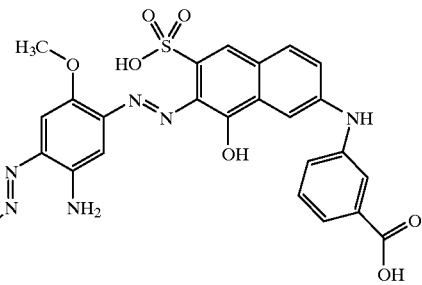
Dye (6)
Dye (7) and salts thereof:
Dye (7)
Dye (8) and salts thereof:
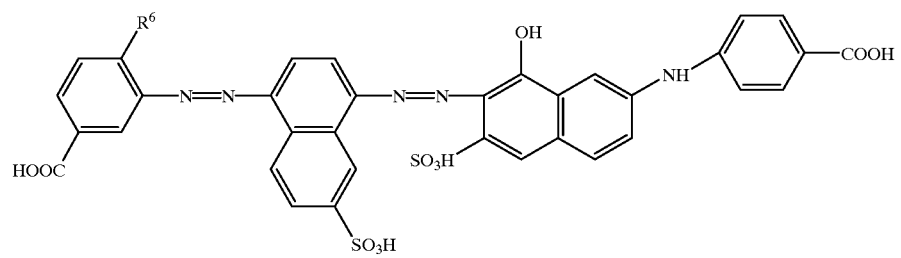
Dye (8)
wherein $R^6$ is H or —$CH_3$;

Dye (9) and salts thereof:
Dye (9)
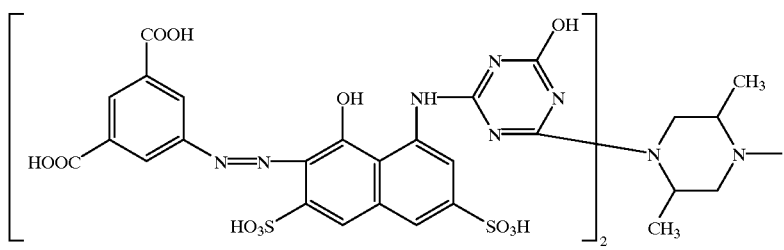
Dye (10) and salts thereof:
Dye (10)
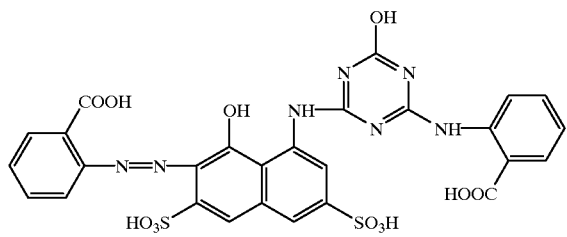
Dye (11) and salts thereof especially the ammonium salt:
Dye (11)
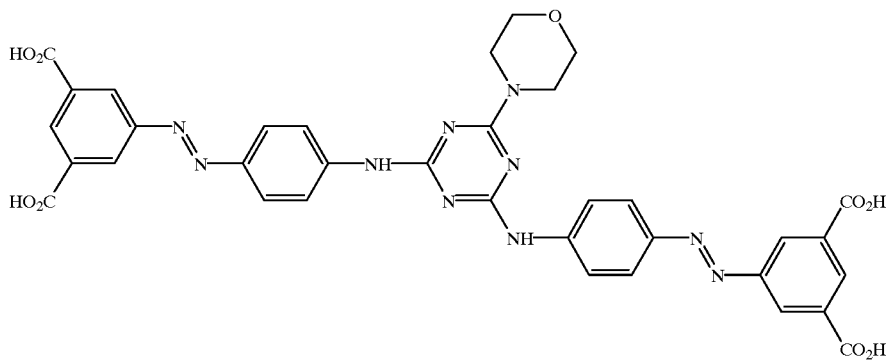
Dye (12) and salts thereof, especially ammonium salts;
Dye (12)
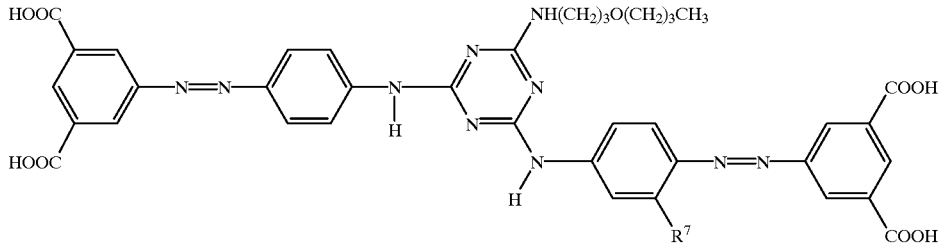
wherein $R^7$ is H or methyl.

Dye (13) and salts thereof:

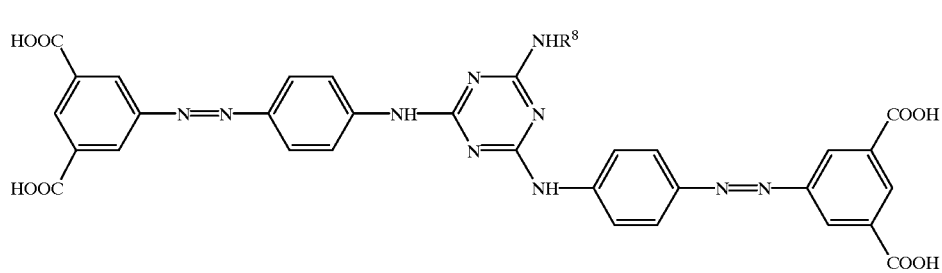

Dye (13)

wherein R⁸ is n-hexyl.

Dye (14) and salts thereof:

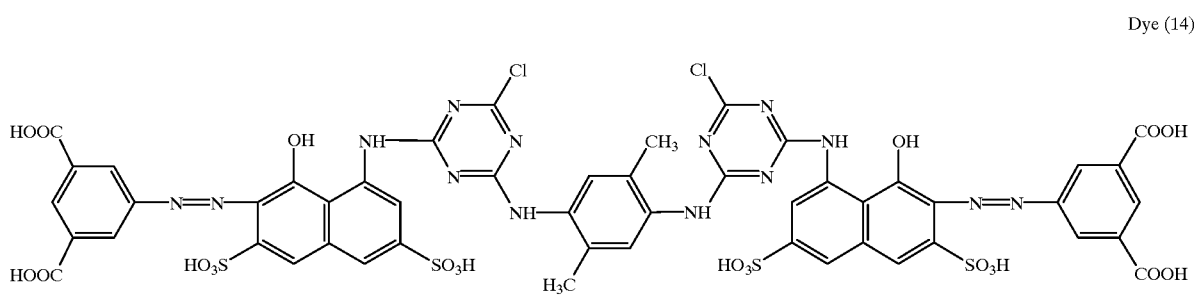

Dye (14)

Dye (15) and salts thereof:

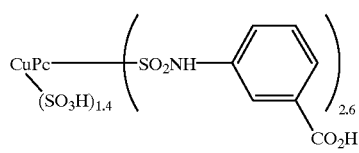

Dye (15)

wherein CuPc is copper phthalocyanine.

Further examples of suitable water-soluble dyes with at least as many carboxy groups as sulpho groups include those disclosed in EP 0 356 080, EP 0 572 419, EP 0 682 088, EP 0 468 648, EP 0 559 309, EP 0 468 647, U.S. Pat. No. 5,374,301, WO 94/16021, WO96/13533 and WO95/31505 which are incorporated herein by reference thereto.

In a further preferred embodiment the water-soluble dye used in the ink is one which contains at least one basic nitrogen group, more preferably 2 or more basic nitrogen groups and especially dyes with at least as many basic nitrogen groups as sulpho groups. Such dyes show a good improvement in properties when a polybasic acid and volatile amine are added to an ink containing a dye in this embodiment.

Preferred basic nitrogen groups include amino, -alkylene amino and 5 or 6 membered rings containing a basic nitrogen (for example morpholine, piperazine and piperidine) each of the aforementioned groups being optionally substituted by $C_{1-6}$-alkyl, $C_{1-6}$-chydroxyalkyl or phenyl.

Especially preferred basic nitrogen groups are piperazine, morpholine and groups of the formula:

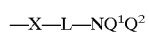

wherein:

X is $C_{1-6}$ (preferably $C_{1-4}$)-alkylene; and $Q^1$ and $Q^2$ are each independently H, $C_{1-6}$-alkyl, $C_{1-6}$-hydroxyalkyl, or phenyl; or $Q^1$ and $Q^2$ together with the nitrogen to which they are attached form a morpholine or piperazine group optionally substituted by $C_{1-4}$-alkyl or $C_{1-4}$-hydroxyalkyl.

Preferred examples of dyes with at least as many basic nitrogen groups as sulpho groups include:

Dye (16) and salts thereof, especially the ammonium salt:

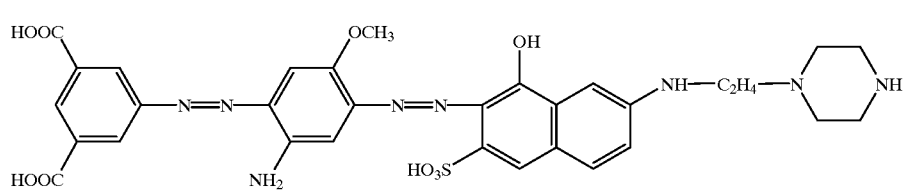

Dye (16)

Dye (17) and salts thereof:

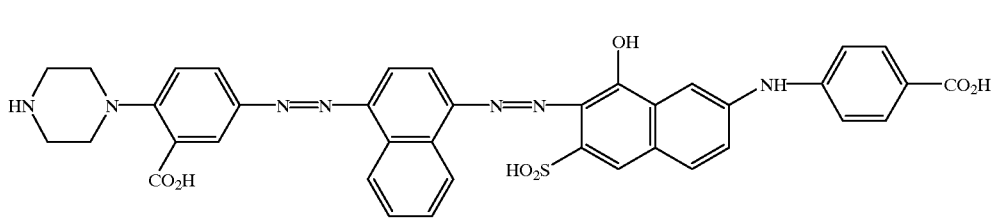

Dye (17)

Dye (18) and salts thereof which is Colour Index International Direct Black 22:

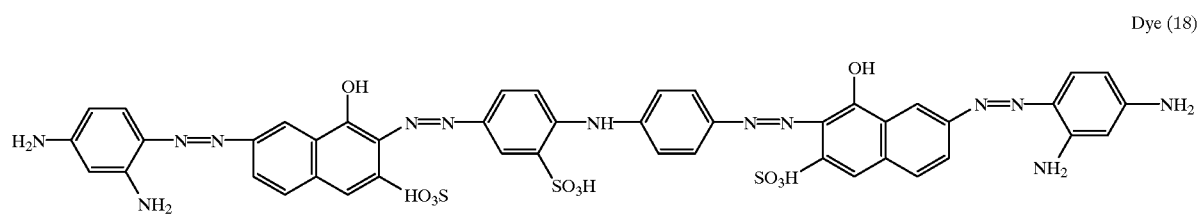

Dye (18)

Dye (19) which is Colour Index International Direct Black 19:

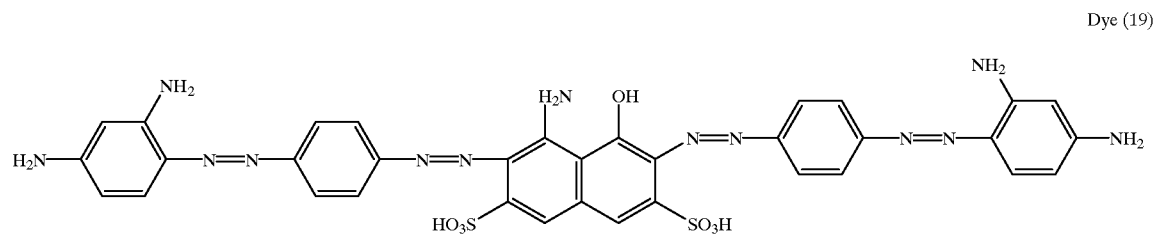

Dye (19)

Dye (20) and salts thereof:

Dye (20)

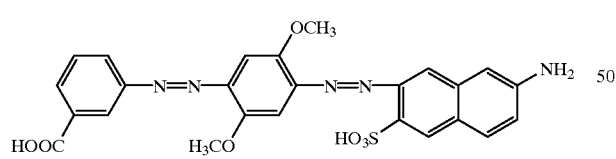

Dye (21) and salts thereof:

(Dye 21)

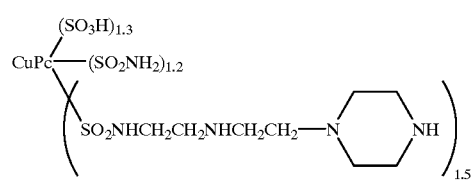

Dye (22) and salts thereof:

(Dye 22)

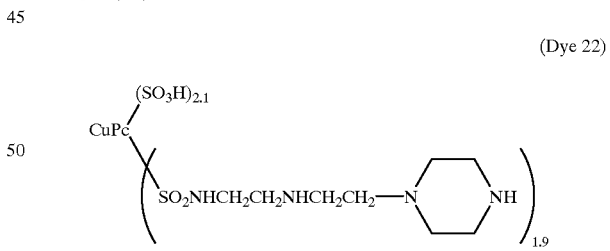

Further suitable dyes which contain basic nitrogen groups include, but are not limited to the dyes described in: Examples 1 to 3 disclosed in WO 97/13813; Examples 1 to 3 disclosed in WO 97/13814; GB 2,306,968; Examples 1 to 7 of WO 97/13812; Examples 1 to 7 of WO 97/13811; Examples 1 to 13 of GB 2,308,377; Examples 1 to 23 of GB 2,308,379A; EP 717,089A1; Examples 1 to 31 of WO 97/32932; and Examples 1 to 52 of WO 97/32931.

Still further examples of water soluble azo dyes suitable for use in the present invention include those described in Examples 1 to 10 of GB 2.308,378A; Examples 1 to 12 of GB 2,308,380A; and water soluble dyes which contain a phosphonic acid group.

The ink may contain a single dye or a mixture of dyes. Examples of preferred mixtures of dyes suitable for use in the ink include a mixture of Dye (1) and Dye (20), and a mixture of Dye (1) and Dye (11).

Dyes (1) to (20) may be used in the free acid form, or in the form of a salt. Preferred salts are alkali metal salts, especially lithium, sodium and potassium salts, ammonium and substituted ammonium salts or mixed ammonium/alkali metal salts. Especially preferred salts are salts with ammonia or sodium.

Dye (1) to Dye (20) may be prepared using processes analogous to those described in the art for other similar azo compounds. For example Dye (1) and Dye (4) may be prepared using the methods described in Examples (1), (2) and (8) of EP 0 356 080.

Dye (2) may be prepared using the method described in Example (1) of our EP 0 572 419.

Dye (3) may be prepared using an analogous process to that described in Example (1) of EP 0 572 419, wherein in place of the 3-aminobenzoic acid there is used 3-amino-2-(N,N-diethylamino)benzoic acid, 3-amino-2-(N,N-propylamino)benzene acid or 3-amino-2-(N,N-dibutylamino)benzoic acid in stage 1.

Dyes (5) and (6) may be prepared using the processes in Example 2 and 1 respectively, of PCT publication number WO 95/31505.

Dye (7) may, for example, be prepared using an analogous process to that described in Example (4) of our EP 0 572 419 wherein in place of 3-aminobenzoic acid in stage 1 there is used 3-amino-2-nitrobenzoic acid and following stage 3, the nitro group is reduced to amino by hydrogenation over a suitable catalyst such as nickel.

Dye (8) may, for example, be prepared using the process described in Example (4) of our EP 0 572 419, wherein $R^6$ is $-CH_3$ in Formula (22) there is used 3-amino-4-methylbenzoic acid in place of 3-aminobenzoic acid in stage 1.

Dye (9) may by prepared using the method described in Example 3 of PCT publication number WO 94/16021.

Dye (10) may be prepared using the method described in Example (1) of EP 0 682 088.

Dye (11) may be prepared using the method described in Example (10) of U.S. Pat. No. 5,374,301.

Dyes (12) and (13) may be prepared using analogous processes to those described in the Examples of EP 572, 419A.

Dye (14) may be prepared using a method analogous to Example (1) of EP 0 468 648, wherein in place of phenylenediamine there is used 2,5-dimethyl-1,4-phenylenediamine.

Dye (15) may be prepared using an analogous process to that described in Example 1 of EP 0 559 309.

Dye (16) may be prepared using the method described in Example (18) of PCT publication number WO 96/13553.

Dye (17) may be prepared using the method described in Example (2) of PCT publication number WO 95/17471.

Dyes (18) and (19) are available commercially as Direct Black 22 and Direct Black 19 respectively.

Dye (21) may be prepared using the process described in Example 1 of WO97/13812.

Dye (22) may be prepared using the process described in Example 1 of WO97/13814.

The ink preferably contains from 0.5 to 20, more preferably from 1 to 15, and especially from 1 to 5 parts, by weight of the water-soluble dye based on the weight of the ink.

The aqueous medium of the ink is preferably water or a mixture of water and one or more water-soluble organic solvent(s). The weight ratio of water to organic solvent(s) is preferably from 99:1 to 1:99, more preferably from 95:1 to 50:50 and especially from 90:10 to 60:40.

The water-soluble organic solvent is preferably selected from $C_{1-4}$-alkanols, for example methanol, ethanol, n-propanol, isopropanol, n-butanol, sec-butanol, tert-butanol and isobutanol; cyclic alkanols, for example cyclohexanol and cyclopentanol; amides, for example dimethylformamide and dimethylacetamide; ketones or ketone-alcohols, for example acetone and diacetone alcohol; ethers, for example tetrahydrofuran and dioxane; oligo- or poly-alkylene glycols, for example diethylene glycols, triethylene glycol, polyethylene glycol and polypropylene glycol; alkenyleneglycols or thioglycols containing a $C_2$—$C_6$-alkylene group, for example ethylene glycol, propylene glycol, butylene glycol, pentylene glycol, hexylene glycol, thioglycol and thiodiglycol; polyols, for example glycerol or 1,2,6-hexanetriol; $C_{1-4}$-alkyl-ethers or polyhdric alcohols, for example 2-methoxyethanol, 2-2-(2-methoxyethoxy)ethanol, 2-(2-ethoxyethoxy)-ethanol, 2-[2-(2-methoxyethoxy) ethoxy]ethanol and 2-[2-(2-ethoxyethoxy)-ethoxy]-ethanol; heterocyclic ketones, for example 2-pyrrolidone and N-methyl-2-pyrrolidone; or mixtures containing two or more of the aforementioned water-soluble organic solvents, for example thiodiglycol and a second glycol or diethylene glycol and 2-pyrrolidone.

Preferred water-soluble organic solvents are 2-pyrrolidone; N-methylpyrrolidone; alkylene glycols and oligo-alkylene glycols, for example ethylene glycol, diethylene glycol and triethylene glycol; lower alkyl ethers of polyhydric alcohols, for example 2-methoxy-2-ethoxy-2-ethoxy-ethanol; polyethylene glycols with a molecular weight of up to 500; and thioglycols, for example thiodiglycol. A preferred specific solvent mixture is a binary or ternary mixture of water and diethylene glycol and/or, 2-pyrrolidone or N-methylpyrrolidone in weight ratios 75–95:25–5 and 60–98:1–20:1–20 respectively. An especially preferred specific solvent mixture is a binary or tertiary mixture of water and thiodiglycol and/or 2-pyrrolidone or N-methylpyrrolidone in weight ratios 75–98:25–2 and 60–90:5–20:5–20 respectively.

It is preferred that the inks further comprise one or more surfactants to aid the penetration of the dye into a paper substrate. Suitable surfactants include anionic surfactants, for example fatty acid salts and alkylbenzenesulphonates; cationic surfactants, for example aliphatic amine salts and quaternary ammonium salts; and non ionic surfactants, for example ethylene oxide adducts of higher alcohols, of alkylphenols, of higher alcohol fatty acid esters, of fatty acid amides, of polypropylene glycol and of acetylene, fatty acid esters of polyhydric alcohols and amino acid and betaine type amphoteric surfactants. It is preferred that the surfactant is a non ionic surfactant, for example SURFYNOL 465™ (available from Air Products Ltd). When a surfactant is used in an ink it is preferably present at a concentration in the range of from 0.01 to 10, more preferably from 0.1 to 5 and especially from 0.1 to 3 parts by weight based upon the weight of the ink.

The inks may also contain other components conventionally used in inks, for example biocides, preservatives, pH adjusters, viscosity modifiers, corrosion inhibitors, and kogation reducing additives.

Further examples of suitable ink media are disclosed in U.S. Pat. Nos. 4,963,189, 4,703,113, 4,626,284 and EP 425,150 which are incorporated herein by reference thereto.

In view of the foregoing preferences, a particularly preferred ink comprises:

(a) from 0.1 to 10 parts of an organic polybasic acid;
(b) from 0.1 to 20 parts of a volatile base;
(c) from 0.5 to 20 parts of a water-soluble dye;
(d) from 50 to 98 parts of water; and
(e) from 2 to 50 parts of water-soluble organic solvent; wherein all parts are by weight and the parts (a)+(b)+(c)+(d)+(e)=100. In addition to the components (a) to (e). The ink may also contain further components as hereinbefore described.

According, to a second aspect of the present invention there is provided an aqueous ink composition having a pH in the range of from 4 to 12 comprising:
(a) an organic polybasic acid and a volatile base, or a salt formed by the said acid and base;
(b) a water-soluble dye; and
(c) an aqueous medium;
provided that:
(i) the aqueous ink composition does not contain a polyamine or a phosphate;
(ii) when the organic polybasic acid is oxalic acid, citric acid or phthalic acid the water-soluble dye has at least as many carboxy groups as sulpho groups; and
(iii) when the volatile base is ammonia the organic polybasic acid has acid groups selected from carboxy, sulpho, phosphono ($-PO_3H_2$), $-SH$ and $-COSH$.

Preferred organic polybasic acids are as hereinbefore defined in the first aspect of the present invention. It is especially preferred that the acidic groups in the organic polybasic acid comprise one or more groups selected from $-COOH$ and $-SO_3H$.

The organic polybasic acid is present in the ink in an amount from 0.1 to 10, more preferably 0.25 to 5 and especially 0.5 to 2 parts by weight of the ink.

The volatile base is present in the ink at a concentration which is sufficient to neutralise at least one, and preferably two of the acid groups present in the organic polybasic acid.

Preferably the inks of the second aspect of the present invention contain sufficient volatile base to give the ink a pH in the range of from 4 to 12, preferably 5 to 12, especially from 7 to 11 and more especially from 7.5 to 10.

When the organic polybasic acid and volatile base are used as a salt of the acid and base, the salt is one formed between any of the organic polybasic acids and volatile bases hereinbefore mentioned as being suitable for inclusion in the novel inks of the present invention. Alternatively, a mixed salt of the acid, the volatile base and one or more other counter ions as hereinbefore described may be used.

The inks according to the second aspect of the present invention may contain a single organic polybasic acid and volatile base or a mixture of said acids and bases. Similarly, a single salt or a mixture of salts of the acid and base may be used in the ink.

The water-soluble dye present in the inks according to the second aspect of the present invention is as hereinbefore defined for the first aspect of the present invention, with the proviso that when the organic polybasic acid is oxalic acid, citric acid or phthalic acid that the water-soluble dye has at least as many carboxy as sulpho groups.

It is preferred that the water-soluble dye is present in the ink in an amount of from 0.5 to 20, more preferably 1 to 15 and especially from 1 to 5 by weight based upon the total weight of the ink composition.

The aqueous medium is as hereinbefore defined for the first aspect of the present invention.

The inks according to the second aspect of the present invention may further comprise one or more surfactants or other components conventionally used in ink-jet printing inks, as hereinbefore defined for the first aspect of the present invention.

Preferred ink compositions are as hereinbefore defined for the first aspect of the present invention.

In view of the foregoing preferences, preferred ink compositions according to the present invention include:
Composition (a)
An aqueous ink composition having a pH in the range 6 to 12 comprising a water-soluble dye, an aqueous medium a volatile amine and an organic polybasic acid, wherein the organic polybasic acid is an aliphatic or aromatic polybasic acid; provided that:
(i) the aqueous ink composition does not contain a polyamine or a phosphate;
(ii) when the organic polybasic acid is oxalic acid, citric acid or phthalic acid that the water-soluble dye has at least as many carboxy as sulpho groups; and
(iii) when the volatile amine is ammonia the organic polybasic acid has acidic groups selected from $-COOH$ and $-SO_3H$.
Composition (b)
As for composition (a) wherein the aliphatic or aromatic polybasic acid is of the hereinbefore defined Formula (2) or the formula: $Z-X_n$ wherein Z and n are as hereinbefore defined and X is $-COOH$ or $-SO_3H$.
Composition (c)
As for composition (a) or (b) wherein the volatile amine is selected from ammonia, methylamine, dimethylamine, trimethylamine, ethylamine, diethylamine, propylamine, isopropylamine, di-isopropylamine, isobutylamine, tert-butylamine and cyclopentylamine.
Composition (d)
As for compositions (b) and (c) wherein W in Formula (2) is an optionally substituted optionally interrupted alkylene or alkenylene group.
Composition (e)
As for compositions (b) and (c) wherein W in Formula (2) is an alkylene group of the formula $-C_mH_{2m}-$, wherein m is 1 to 18.
Composition (f)
As for composition (a), (b) or (c) wherein that the acid is selected from phthalic acid, isophthalic acid terephthalic acid, malonic acid, succinic acid, glutaric acid, adipic acid, pimelic acid, suberic acid, azelaic acid, sebacic acid, tartaronic acid, malic acid, tartaric acid, mucic acid, dodecanedioc acid, maleic acid, fumaric acid, citraconic acid, itaconic acid, cyclohexene dicarboxylic acid, cyclohexane dicarboxylic acid, citric acid, diglycolic acid, 3,3'-thiodipropionic acid, thiodiglycolic acid, camphoric acid, 1,1-cyclohexane diacetic acid, 1,3-acetondicarboxylic acid, 1,2,3,4-butanetetracarboxylic acid.
Composition (g)
As for compositions (a) to (f) wherein the water-soluble dye a water-soluble azo, or phthalocyanine dye.
Composition (h)
As for compositions (a) to (f) wherein the water-soluble dye has a solubility in water which decreases with decreasing pH.
Composition (i)
As for compositions (a) to (f) wherein the water-soluble dye is a dye having at least as many carboxy as sulpho groups.

As hereinbefore mentioned, a preferred class of dye is one which contains at least as many basic nitrogen groups as sulpho groups. Ink compositions containing such dyes form a further aspect of the present invention. Accordingly, a third aspect of the present invention provides an aqueous ink composition having a pH in the range of from 5 to 12 comprising an organic polybasic acid and a volatile base, or a salt formed by said acid and base; a water-soluble dye having at least as many basic nitrogen groups as sulpho groups; and an aqueous medium; provided that the ink composition does not contain a polyamine or a phosphate.

Preferred dyes are as hereinbefore defined for the first aspect of the present invention.

Preferred organic polybasic acids, volatile bases, aqueous media and ink pH are as defined for the first aspect of the present invention.

As will be understood the proviso that the ink compositions according to the second and third aspects of the present invention do not contain a polyamine or a phosphate, refers to components in the ink other than the dye itself. Examples of compounds excluded from the present ink compositions include polyamines, for example triethylene tetra amine, polyamines containing acidic groups, for example ethylenediamine tetra acetic acid and phosphates, for example ammonium phosphate.

The ink compositions according to the second and third aspects of the present invention may be prepared in a number of ways as will be evident to one of ordinary skill in the field of ink chemistry. For example, a suitable method comprises addition of the dye to the aqueous medium with stirring. To this mixture is added an aqueous solution or dispersion of the polybasic acid, followed by the volatile base. An excess of the volatile base may be added to raise the pH of the ink to the desired range of 4 to 12. The other components that may be present in the ink such as surfactants and biocides etc. are then added. The mixture is stirred and filtered through a 0.45 micron filter. When a salt of the polybasic acid and volatile base is used in the ink, the salt is added to the ink, preferably as an aqueous solution, in place of the separate polybasic acid and volatile base components of the ink.

When the ink composition contains a salt of an organic polybasic acid and a volatile base, the salt may be prepared by adding the acid to the base in a liquid medium, preferably an aqueous medium.

According to a fourth aspect of the present invention there is provided a method for increasing the water fastness of a water-soluble dye comprising addition of an effective amount of a polybasic acid and a volatile base, or a salt formed by the said acid and base, to an aqueous ink containing the water-soluble dye.

Preferred polybasic acids, volatile bases and salts thereof are as hereinbefore defined in the first aspect of the present invention.

Preferably the 0.1 to 10, more preferably 0.25 to 5 and especially 0.5 to 2 parts by weight of polybasic acid are added to the aqueous ink, wherein parts are by weight based upon the weight of the ink.

The amount of volatile base which is added to the aqueous ink is as hereinbefore defined in the first aspect of the invention. It is especially preferred that the volatile base is ammonia.

Preferred water-soluble dyes and aqueous inks containing the dyes are as hereinbefore defined in the first aspect of the invention.

According to a fifth aspect of the present invention there is provided a process for printing a substrate with the an ink composition using an ink jet printer characterised in that the ink composition is as hereinbefore defined for the second or third aspects of the present invention.

A suitable process for the application of an ink as hereinbefore defined comprises forming the ink into small droplets by ejection from a reservoir through a small orifice so that the droplets of ink are directed at a substrate. This process is commonly referred to as ink jet printing. The inks of the present invention are suitable for use in all known ink jet printing processes. Preferred ink jet printing processes are thermal ink jet printing and piezoelectric ink jet printing. In thermal ink jet printing, droplets of ink are ejected from the ink jet nozzle towards a substrate during relative movement between the nozzle and the substrate in response to an electrical recording signal which heats a resistor in the ink jet head thereby heating the ink and causing ejection of ink from the nozzle.

In piezoelectric ink jet printing ink droplets are formed and ejected from the ink jet nozzle by the vibrations of piezoelectric material in the ink jet head in response to an electrical recording signal.

Preferred substrates include plastic, a textile material, metal, glass, ceramics, overhead projector slides and paper, more preferably paper and a textile material.

Preferred textile materials include a natural, semi-synthetic or synthetic material. Examples of natural textile materials include wool, silk, hair and cellulosic materials, particularly cotton, jute, hemp, flex and linen. Examples of synthetic and semi-synthetic materials include polyamides, polyesters, polyacrylonitriles and polyurethanes.

Preferred papers are plain or treated papers which may have an acid, alkaline or neutral character. Examples of commercially available treated papers include HP Premium Coated Paper (available from Hewlett Packard Inc), HP Photopaper (available from Hewlett Packard Inc), Stylus Pro 720 dpi Coated Paper, Epson Photo Quality Glossy Film (available from Seiko Epson Corp.), Epson Photo Quality Glossy Paper (available from Seiko Epson Corp.), Canon HR 101 High Resolution Paper (available from Canon), Canon GP 201 Glossy Paper (available from Canon), and Canon HP 101 High Gloss Film (available from Canon).

The inks described herein may be used in admixture or separately with other inks in an ink jet printer to give a printer capable of printing a variety of colours and shades. Suitable other inks have been fully described in the prior art.

According to a sixth aspect of the present invention, there is provided a paper, a textile material or a metal, ceramic or glass substrate printed with an ink according to the second or third aspects of the present invention.

According to a seventh aspect of the present invention there is provided an ink jet printer cartridge containing an ink according to the second or third aspect of the present invention.

The invention is further illustrated by the following Examples in which all parts and percentages are by weight unless otherwise indicated.

EXAMPLE 1

Dye (1)

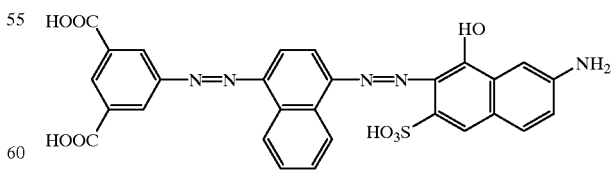

Dye (1)

Dye (1) was prepared as the ammonium salt using the method described in Example 1 of EP 356,080.

Ink 1 and Ink 2, were prepared as described below using an ink medium comprising water (90 parts) and 1-methyl-2-pyrrolidinone (10 parts):

Ink 1:
   2.5% Dye (1);
   1% Citric acid (polybasic acid);
   ammonia (volatile base) in a quantity sufficient to give the ink a pH of 9 to 10;
   and the balance was the ink medium.
Ink 2:
   As for Ink 1 but without the citric acid.
   Ink 1 was prepared as follows:
   An ink medium of distilled water (90 parts) and 1-methyl-2-pyrrolidinone (10 parts) was mixed to give a homogeneous solution.
   A 5% solution of the dye in the ink medium was then made by dissolving 5 parts of the dye in approximately 80 parts of the ink medium by the addition of concentrated ammonia solution until a pH of 9 to 10 was reached. The resulting mixture was then made up to 100 parts by the further addition of the ink medium.
   A 2% solution of citric acid in the ink medium was made by dissolving 2 parts of the acid in approximately 70 parts of the ink medium by the addition of concentrated ammonia solution until a pH of 9 to 10 was reached. The citric acid solution was then made to 100 parts by the further addition of the ink medium.
   The final ink was made by mixing 50 parts of the 5% dye solution with 50 parts of the 2% citric acid solution and filtering the ink through a 0.45 micron filter to give an ink with the 2.5% dye and 1% citric acid loading and a pH between 9 and 10.

Ink 2 was prepared as for Ink 1 except in the place of the citric acid water was added.

Ink Jet Printing

Inks 1 and 2 were printed onto the papers shown in Table 1 using an HP 500 Desk Jet™ ink jet printer as a series of 5 parallel bars 24 hours after printing the prints were subjected to a run down test to assess the water fastness of the prints.

In the run down test a print was held at a 45° angle so that the parallel bars were in a horizontal direction. A 3 ml disposable bulb pipette (ex. Alpha Labs Ltd., Eastleigh, Hampshire—supplied by Orme Scientific), cut down to the 0.5 ml mark (to give a 6 mm aperture) was filled to the 0.1 ml mark with distilled water. The distilled water was then applied to the prints just above the top of the parallel printed bars, taking care to ensure that the rundown of the water occurred as a single 'track' which was as vertical as possible through the horizontal printed bars.

The water-fastness of the prints was assessed by measuring the reflected optical density (ROD) in the area stained by the rundown of the water below the first four printed bars and calculating the mean ROD for each print. The ROD values were measured using an X-Rite™938 densitometer set to status T (Den T). The mean ROD was matched to a scale of 1 to 10 wherein 1 corresponds to a high mean ROD and hence a poor water fastness (i.e. high degree of staining between the printed bars) and 10 corresponds to a low mean ROD and a high water fastness (i.e. negligible staining between the printed bars). The scale values of 1 to 10 correspond to the following mean ROD values:

| Scale Value | 1 | 2 | 3 | 4 | 5 | 6 | 7 | 8 | 9 | 10 |
|---|---|---|---|---|---|---|---|---|---|---|
| Mean ROD | 1.280 | 1.050 | 0.830 | 0.615 | 0.430 | 0.295 | 0.200 | 0.135 | 0.100 | 0.080 |

The water fastness of the prints measured 24 hours after printing is shown in Table 1:

TABLE 1

| | Water fastness after 24 hours | |
|---|---|---|
| Paper | Ink 1 (1% Citric acid) | Ink 2 (0% Citric acid) |
| Xerox acid | 9 | 7 |
| Xerox alkaline | 7 | 5 |
| Gilbert Bond | 9 | 7 |
| Wiggins Conqueror | 7 | 5 |
| HP Premium ink jet | 10 | 7 |

EXAMPLES 2 TO 16

In Examples 2 to 16 an ink containing 2.5% Dye (1) (as described in Example 1) in an ink medium comprising water (90 parts) and 1-methyl-2-pyrrolidinone (10 parts) were prepared with a 1% loading of the polybasic acid shown in Table 2 and ammonia as the volatile base. The inks were applied to the papers shown in Table 2 using a HP 500 Desk Jet Printer. 24 hours after printing, the water fastness of the resulting prints was measured using the run down test described in Example 1.

All of the inks were prepared in a manner analogous to Example 1, wherein 50 parts of a 5% dye solution in the ink medium were added to 50 parts of 2% polybasic acid in a solution of the ink base with ammonia to give an ink with 2.5% dye, 1% of the polybasic acid shown in Table 2 and a pH of 9 to 10.

The results of the water fastness tests are shown in Table 2 under the heading "water fastness 24 hours after printing" for each of the paper types. To illustrate the improvement in water-fastness resulting from the inclusion of the polybasic acid and the ammonia, Example 2 at the top of Table 2 shows the water fastness of the prints obtained using the same ink formulation without a polybasic acid in the ink.

Comparative Example 1

In Comparative Example 1 acetic acid (a monobasic acid) at a loading of 1% was added to the ink in place of the polybasic acid used in Examples 2 to 16. The water fastness results obtained are shown at the bottom of Table 2. The results clearly show the surprising increase in water fastness obtained by using polybasic acids in inks (Examples 2 to 16) compared with the use of monobasic acetic acid. In fact the use of the monobasic acetic acid in the ink decreased the water fastness compared with the inks without an acid additive (compare Example 2, no acid, with Comparative Example 1, 1% acetic acid).

TABLE 2

Effect of 1% Polybasic acid and ammonia on water-fastness

| | | Water fastness 24 hours after printing | | | | |
|---|---|---|---|---|---|---|
| Example | Polybasic Acid | Xerox Acid | Xerox Alkaline | Gilbert Bond | Wiggins Conqueror | HP Premium Ink Jet |
| 2 (Control) | — | 7 | 5 | 7 | 5 | 7 |
| 3 | Succinic acid | 9 | 8 | 9 | 8 | 9 |
| 4 | Fumaric acid | 9 | 8 | 9 | 8 | 9 |
| 5 | Azelinic acid | 9 | 8 | 9 | 8 | 9 |
| 6 | Adipic acid | 9 | 8 | 9 | 9 | 10 |
| 7 | D/L - malic acid | 9 | 8 | 8 | 7 | 10 |
| 8 | Nitrolotriacetic acid | 9 | 7 | 8 | 7 | 9 |
| 9 | 1,3,5-benzene-tricarboxylic acid | 7 | 6 | 8 | 6 | 10 |
| 10 | 1,2,3,4-butane-tetracarboxylic acid | 8 | 5 | 7 | 6 | 9 |
| 11 | 4-sulphophthalic acid | 8 | 7 | 9 | 7 | 9 |
| 12 | Phthalic acid | 9 | 7 | 9 | 7 | 10 |
| 13 | Iso phthalic acid | 9 | 7 | 10 | 8 | 10 |
| 14 | Teraphthalic acid | 9 | 7 | 10 | 7 | 9 |
| 15 | Nitrilo(methylene) triphosphoric acid | 7 | 6 | 6 | 6 | 10 |
| 16 | L-tartaric acid | 7 | 6 | 7 | 6 | 8 |
| Comparative Example 1 | Acetic acid | 6 | 6 | 6 | 6 | 6 |

EXAMPLE 17 TO 29

Effect of Polybasic Acid Concentration on Water Fastness

Inks containing 2.5% Dye (1) and the polybasic acid at the loading specified in Table 3 were formulated with ammonia as the volatile base using an ink medium of water (90 parts) and 1-methyl-2-pyrollidinone (10 parts) as in Example 1. As in the previous Examples sufficient ammonia was added to the inks to give the ink a pH in the range 9 to 10. The inks were then applied to the papers specified in Table 3 using an HP 500 Desk Jet Printer ink jet printer and the water-fastness of the resulting prints was measured 24 hours after printing using the same test as in Example 1. The row marked 'control' in Table 2 refers to the water-fastness of prints when no polybasic acid was present in the ink.

TABLE 3

Effect of polybasic acid loading on water fastness

| Example | Polybasic Acid | Polybasic Acid loading (%) | Xerox Acid | Xerox Alkaline | Gilbert Bond | Wiggins Conqueror | HP Premium Ink Jet |
|---|---|---|---|---|---|---|---|
| Control | — | 0 | 7 | 5 | 7 | 5 | 7 |
| 17 | Citric Acid | 0.25 | 7 | 6 | 7 | 6 | 10 |
| 18 | Citric Acid | 0.5 | 8 | 5 | 7 | 6 | 10 |
| 19 | Citric Acid | 1 | 9 | 7 | 9 | 7 | 10 |
| 20 | Citric Acid | 2 | 10 | 7 | 9 | 7 | 10 |
| 21 | Citric Acid | 4 | 9 | 6 | 9 | 8 | 9 |
| 22 | Terephthalic Acid | 0.25 | 7 | 6 | 8 | 7 | 9 |
| 23 | Terephthalic Acid | 0.5 | 9 | 7 | 9 | 7 | 8 |
| 24 | Terephthalic Acid | 1 | 9 | 7 | 10 | 7 | 10 |
| 25 | Terephthalic Acid | 2 | 10 | 7 | 10 | 9 | 10 |
| 26 | Adipic Acid | 0.25 | 7 | 6 | 7 | 7 | 10 |
| 27 | Adipic Acid | 0.5 | 9 | 7 | 8 | 7 | 10 |
| 28 | Adipic Acid | 1 | 9 | 8 | 9 | 9 | 10 |
| 29 | Adipic Acid | 2 | 10 | 8 | 10 | 9 | 10 |

EXAMPLES 30 TO 49

In Table 4 inks comprising:

2.5% Dye (1);

9% 2-pyrrolidone;

9% thiodiglycol;

2% cyclohexanol; and

1% of the polybasic acid shown in Table 4.

Were adjusted to pH 9 to 10 using ammonia as the volatile base. The inks were then applied to Xerox Acid paper using an HP 500 Desk Jet Printer and the water fastness of the prints was assessed 24 hours after printing using the same run down test described in Example 1.

The column marked ROD in Table 4 refers to the reflected optical density of the prints prior to performing the rundown test. The results illustrate that the inclusion of the polybasic acid and volatile base do not markedly affect the optical density of the prints compared with inks free from the polybasic acid. In the majority of cases the optical density of the print was increased by including the polybasic acid in the ink, indicating a reduction in bronzing of the prints.

TABLE 4

| Example | Polybasic acid | ROD | Waterfastness 24 hours after printing |
|---|---|---|---|
| Control | None | 1.33 | 7 |
| 30 | Citric | 1.35 | 9 |
| 31 | Terephthalic | 1.3 | 9 |
| 32 | Adipic | 1.39 | 9 |
| 33 | Nitrilotriacetic | 1.38 | 9 |
| 34 | Malic | 1.38 | 9 |
| 35 | Fumaric | 1.34 | 9 |
| 36 | Phthalic | 1.36 | 9 |
| 37 | Isophthalic | 1.36 | 9 |
| 38 | Tartaric | 1.38 | 9 |
| 39 | Succinic | 1.38 | 9 |
| 40 | Azelaic | 1.37 | 9 |
| 41 | 1,2,3,4 butanetetracarboxylic | 1.38 | 8 |
| 42 | Sulphoisophthalic | 1.4 | 8 |
| 43 | Iminodiacetic | 1.28 | 8 |
| 44 | Ethylenediamine tetra acetic | 1.29 | 9 |

TABLE 4-continued

| Example | Polybasic acid | ROD | Waterfastness 24 hours after printing |
|---|---|---|---|
| 45 | Diglycolic | 1.15 | 8 |
| 46 | Dihydroxyfumaric | 1.04 | 8 |
| 47 | Malonic | 1.27 | 9 |
| 48 | Maleic | 1.23 | 9 |
| 49 | Mucic | 1.1 | 8 |

EXAMPLES 50 TO 57

Dye A

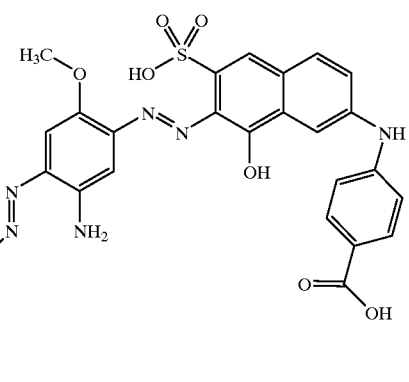

Dye A

Dye A was prepared using the process described in Example (2) of WO 95/31505.

Dye B

Dye B has the structure:

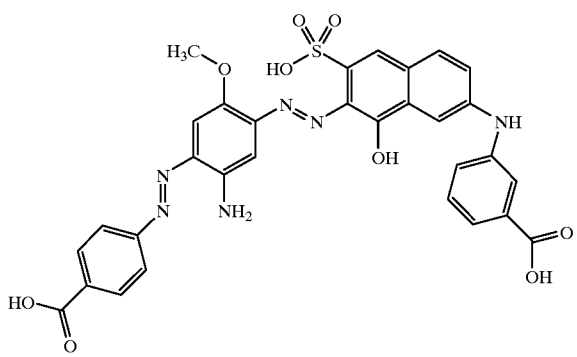

Dye B was prepared using the process described in Example 1 of WO 95/31505.

In Table 5 inks containing the specified dye and dye loading were formulated with the specified polybasic acid in an ink medium of water (90 parts) and 1-methyl-2-pyrrolidinone (10 parts) using the formulation method of Example 1. As in Example 1 the volatile base was ammonia which was added to the ink to give a pH in the range 9 to 10. The formulated inks were printed onto the paper specified in Table 5 using an HP 500 Desk Jet ink jet printer and the water-fastness of the resulting prints was measured 24 hours after printing using the same test as in Example 1.

Examples 50 and 54 were control tests wherein the ink did not contain a polybasic acid.

TABLE 5

| Example | Dye | Dye Loading (%) | Polybasic Acid | Polybasic Acid Loading (%) | Waterfastness 24 hours after printing | | |
|---|---|---|---|---|---|---|---|
| | | | | | Xerox Acid | Xerox Alkaline | Gilbert Bond |
| 50 (control) | A | 2.5 | — | 0 | 7 | 6 | 7 |
| 51 | A | 2.5 | Phosphoric acid | 1 | 10 | 9 | 9.5 |
| 52 | A | 2.5 | Citric acid | 1 | 10 | 7.5 | 10 |
| 53 | A | 3.75 | Citric acid | 1 | 10 | 6 | 9.5 |
| 54 (control) | B | 2.5 | — | 0 | 7 | 5 | 7 |
| 55 | B | 2.5 | Citric acid | 1 | 9.5 | 7 | 9 |
| 56 | B | 2.5 | Citric acid | 2 | 10 | 8 | 10 |
| 57 | B | 4 | Citric acid | 1.34 | 9 | 6 | 7 |

EXAMPLES 58 TO 63

Dye (9)

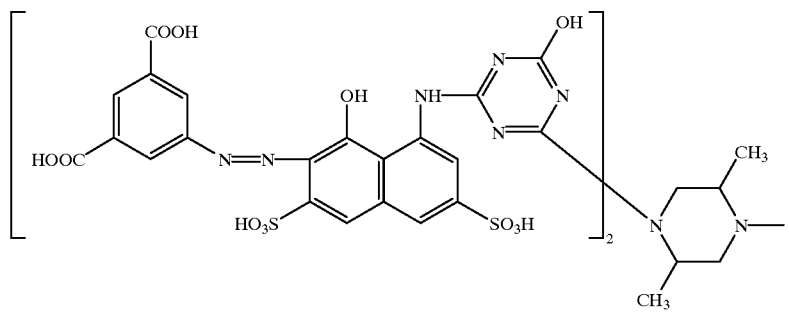

Dye (9)

Dye (9) was prepared as the salt with ammonia using the method described in Example 3 of EP 679,173.

In Table 6 inks containing the dye shown in the indicated formulation were prepared containing the acid shown in column 4 at the loading shown. The pH of the ink was then adjusted to 9 to 10 using ammonia. The inks were printed onto Xerox™ Acid paper using an HP 500 Desk Jet Printer and the water fastness was measured 24 hours after printing using the run down test described in Example 1. In Table 6 the column marked ROD refers to the reflected optical density of the print prior to performing the run down test.

The formulation 522 refers to:
3.5% dye;
5% 2-pyrrolidone;
5% thiodiglycol; and
2% Surfynol™465 (a surfactant available from Air Products).
Formulation 992 refers to:
2.5% dye;
9% 2-pyrrolidone;
9% thiodiglycol; and
2% cyclohexanol.

In each example the balance of the ink composition was water.

Dye (1) in Table 6 was the same as that described in Example 1.

TABLE 6

| Example | Dye | Formulation | Polybasic Acid | Acid loading | ROD | Water fastness 24 hours after printing |
|---|---|---|---|---|---|---|
| 58 (Control) | Dye (9) | 522 | None | 0 | 1.04 | 8 |
| 59 | Dye (9) | 522 | Succinic acid | 1 | 1.01 | 9 |
| 60 | Dye (9) | 522 | Succinic acid | 2 | 0.96 | 9 |
| 61 | Dye (9) | 522 | Succinic acid | 4 | 1 | 9 |
| 62 (Control) | Dye (1) | 992 | None | 0 | 1.26 | 7 |
| 63 | Dye (1) | 992 | Citric acid | 1 | 1.3 | 10 |

What is claimed is:

1. An aqueous ink composition having a pH in the range of from 4 to 12 comprising:
   (a) an organic polybasic acid and a volatile base, or a salt formed by the said acid and base;
   (b) a water-soluble dye; and
   (c) an aqueous medium;
   wherein the volatile base, has a boiling point of less than 80° C.; and the organic polybasic acid is an aliphatic acid including 2 to 8 acid groups or an aromatic acid of Formula (1):

$$Z-X_n \qquad (1)$$

wherein
   Z is an aromatic group;
   each X independently is an acidic group;
   n is 1, 2, 3, or 4; and
   provided that:
   (i) the aqueous ink composition does not contain a polyamine or a phosphate;
   (ii) when the organic polybasic acid is oxalic acid, citric acid or phthalic acid the water-soluble dye has at least as many carboxy as sulpho groups; and
   (iii) when the volatile base is ammonia the organic polybasic acid has acid groups selected from carboxy, sulpho, phosphono, —SH and —COSH.

2. An aqueous ink composition having a pH in the range of from 4 to 12 comprising:
   (a) an organic polybasic acid and a volatile base, or a salt formed by the said acid and base;
   (b) a water-soluble dye having at least as many basic nitrogen groups as sulpho groups; and
   (c) an aqueous medium;
   wherein the volatile base has a boiling point of less than 80° C.; and the organic polybasic acid is an aliphatic acid with 2 to 8 acid groups or an aromatic acid of the Formula (1):

$$Z-X_n \qquad (1)$$

wherein;
   Z is an aromatic group;
   each X independently is an acidic group;
   n is 1,2,3, or 4; and
   provided that:
   (i) the aqueous ink composition does not contain a polyamine or a phosphate;
   (ii) when the organic polybasic acid is oxalic acid, citric acid or phthalic acid the water-soluble dye has at least as many carboxy as sulpho groups; and
   (iii) when the volatile base is ammonia the organic polybasic acid has acid groups selected from carboxy, sulpho, phosphono, —SH and —COSH.

3. An ink according to claim 1 wherein the organic polybasic acid has a first pKa in the range of from 2 to 6 and a second pKa in the range of from 3.5 to 8.

4. An aqueous ink composition having a pH in the range of from 4 to 12 comprising:
   (a) an organic polybasic acid and a volatile base, or a salt formed by the said acid and base;
   (b) a water-soluble dye; and
   (c) an aqueous medium;
   wherein the volatile base has a boiling point of less than 80° C.; and the organic polybasic acid is an aromatic polybasic acid of Formula (1):

$$Z-X_n \qquad (1)$$

wherein:
   Z is an aromatic group:
   each X independently is selected from carboxy, sulpho, phosphono, —SH and —COSH;
   n is 2, 3, or 4;
   provided that:
   (i) the aqueous ink composition does not contain a polyamine or a phosphate;
   (ii) when the organic polybasic acid is oxalic acid, citric acid or phthalic acid the water-soluble dye has at least as many carboxy as sulpho groups; and
   (iii) when the volatile base is ammonia the organic polybasic acid has acid groups selected from carboxy, sulpho, phosphono, —SH and —COSH.

5. An aqueous ink composition having a pH in the range of from 4 to 12 comprising:
   (a) an organic polybasic acid and a volatile base, or a salt formed by the said acid and base;
   (b) a water-soluble dye; and
   (c) an aqueous medium;
   wherein the volatile base has a boiling point of less than 80° C.; and the organic polybasic acid is an aliphatic polybasic acid containing up to 20 atoms, and
   provided that:
   (i) the aqueous ink composition does not contain a polyamine or a phosphate;
   (ii) when the organic polybasic acid is oxalic acid, citric acid or phthalic acid the water-soluble dye has at least as many carboxy as sulpho groups; and (iii) when the volatile base is ammonia the organic polybasic acid has acid groups selected from carboxy, sulpho, phosphono, —SH and —COSH.

6. An ink according to claim 5 wherein the aliphatic polybasic acid is a compound of the Formula (2):

HOOC—W—COOH     (2)

wherein W is optionally substituted, optionally interrupted alkylene, alkenylene or alkynylene group.

7. An ink according to claim 1 wherein the organic polybasic acid is free from chromophoric groups.

8. An ink according to claim 1 wherein the volatile base is ammonia or an amine with a boiling point of less than 80° C.

9. An ink acording to claim 1 the water-soluble dye is a water-soluble monoazo, disazo, tris azo or phthalocyanine dye.

10. An ink according to claim 1 wherein the water-soluble dye has a water solubility that reduces as pH is reduced.

11. A ink according to claim 1 wherein the water-soluble dye has at least as many carboxy as sulpho groups.

12. An ink according to claim 1 wherein the aqueous medium comprises water and a water-soluble organic solvent.

13. An ink according to claim 1 comprising:
    (a) from 0.1 to 10 parts of the organic polybasic acid;
    (b) from 0.1 to 20 parts of the volatile base;
    (c) from 0.5 to 20 parts of the water-soluble dye;
    (d) from 50 to 98 parts of water; and
    (e) from 2 to 50 parts of water-soluble organic solvent;
wherein all parts are by weight and the parts (a)+(b)+(c)+(d)+(e)=100.

14. An ink according to claim 1 wherein the volatile base is ammonia and the organic polybasic acid has acid groups selected from the group consisting of —COOH and —SO$_3$H.

15. A method for increasing the water-fastness of a water-soluble dye comprising addition of an effective amount of a polybasic acid and a volatile base, or a salt formed by the said acid and base, to an aqueous ink containing the water-soluble dye wherein the volatile base has a boiling point of less than 80° C.; and the organic polybasic acid is an aliphatic acid with 2 to 8 acid groups or an aromatic acid of the Formula (1):

Z—X$_n$     (1)

wherein:
    Z is an aromatic group;
    each X independently is an acidic group; and
    n is 1, 2, 3, or 4.

16. A process for printing a substrate with an ink jet printer wherein application of ink comprises forming the ink into small droplets by ejection from a reservoir through a small orifice so that droplets of ink are directed at a substrate, characterized in that the ink is as defined in claim 1.

17. A paper, or a metal, ceramic or glass substrate or a textile material printed with an ink according to claim 1.

18. An ink jet printer cartridge containing an ink as defined in claim 1.

19. In an aqueous ink composition adapted for use in an ink jet printing process, the improvement comprising a polybasic acid and a volatile base, or a salt formed by the said acid and base, added to said aqueous ink composition to increase the water fastness of a water-soluble dye contained in the ink and where the polybasic acid contains one or more acid groups selected from the group consisting of carboxy, sulpho, monobasic phosphate ester, a monobasic phosphonic ester, —COSH and thiol.

20. The composition according to claim 19 wherein the polybasic acid is an inorganic or organic polybasic acid with a first pKa in the range of from 2 to 6 and a second pKa in the range of from 3.5 to 8.

21. The composition according to claim 19 wherein the organic polybasic acid is a compound of the Formula (1):

Z—X$_n$     (1)

wherein:
    Z is an aromatic or aliphatic group;
    each X independently is an acidic group; and
    n is 2, 3 or 4;
provided that the acid is polybasic.

22. The composition according to claim 19 wherein the polybasic acid is present in an amount of from 0.1 to 10 parts by weight based upon the weight of the ink.

23. The composition according to claim 19 wherein the volatile base has a boiling point of less than 80° C.

24. The composition according claim 23 wherein the volatile base is ammonia.

25. The composition according to claim 19 wherein the ink has a pH in the range of from 4 to 12.

26. The composition according to claim 19 wherein the water-soluble dye has at least as many carboxy groups as sulpho groups.

27. The composition according to claim 19 wherein the water-soluble dye has at least as many basic nitrogen groups as sulpho groups.

28. A composition as claimed in claim 19 wherein the polybasic acid is an aromatic polybasic acid and the acidic groups are selected from —SO$_3$H— and —COOH—.

29. A composition as claimed in claim 19 wherein the polybasic acid is a saturated or unsaturated aliphatic acid which contains from 2 to 8 acid groups.

30. An aqueous ink composition adapted for use in an ink jet printing process where an improvement comprises a polybasic acid, wherein said polybasic acid is an aliphatic polybasic acid containing up to 20 carbon atoms; and a volatile base, or a salt formed by the said acid and base, added to said aqueous ink composition to increase the water fastness of a water-soluble dye contained in the ink.

31. An aqueous ink composition adapted for use in an ink jet printing process, where an improvement comprises a polybasic acid and a volatile base, or a salt formed by the said acid and base, added to said aqueous ink composition to increase the water fastness of a water-soluble dye contained in the ink wherein the aliphatic polybasic acid is a compound of the Formula (2):

HOOC—W—COOH     (2)

wherein W is an optionally substituted, optionally interrupted alkylene, alkenylene or alkynylene group.

* * * * *